(12) United States Patent
Nasr et al.

(10) Patent No.: US 12,528,249 B2
(45) Date of Patent: Jan. 20, 2026

(54) POWDER REMOVAL APPARATUSES FOR ADDITIVE MANUFACTURING APPARATUSES

(71) Applicant: General Electric Company, Schenectady, NY (US)

(72) Inventors: Hojjat Nasr, West Chester, OH (US); Jinjie Shi, Farmington Hills, MI (US); Christopher Michael Bryant, Harrison, OH (US); Jay Matthew Lang, Martins Ferry, OH (US); Valeria Stoughton, Blue Ash, OH (US); Glen Charles Fedyk, Fairfield, OH (US)

(73) Assignee: General Electric Company, Evendale, OH (US)

( * ) Notice: Subject to any disclaimer, the term of this patent is extended or adjusted under 35 U.S.C. 154(b) by 110 days.

(21) Appl. No.: 18/634,218

(22) Filed: Apr. 12, 2024

(65) Prior Publication Data
US 2025/0319661 A1 Oct. 16, 2025

(51) Int. Cl.
B29C 64/35 (2017.01)
B22F 10/68 (2021.01)
(Continued)

(52) U.S. Cl.
CPC ............. B29C 64/35 (2017.08); B22F 10/68 (2021.01); B22F 12/38 (2021.01); B29C 64/255 (2017.08); B29C 71/0009 (2013.01); B33Y 30/00 (2014.12); B33Y 40/20 (2020.01); B29C 2071/0045 (2013.01)

(58) Field of Classification Search
None
See application file for complete search history.

(56) References Cited

U.S. PATENT DOCUMENTS 10,183,330 B2    1/2019   Buller et al.
10,195,693 B2    2/2019   Buller et al.
(Continued)

FOREIGN PATENT DOCUMENTS

CN    108656554 A      10/2018
DE    102015213165 A1   1/2017
(Continued)

OTHER PUBLICATIONS

Extended European Search Report for Application No. 25168352.0 dated Sep. 11, 2025 (8 pages).

Primary Examiner — Yung-Sheng M Tsui
(74) Attorney, Agent, or Firm — Dinsmore & Shohl LLP

(57) ABSTRACT

A powder removal apparatus includes an extraction housing comprising a sidewall that is sized and configured to extend around a powder bed of a build module and a top wall that is sized and configured to extend between opposite sides of the sidewall and over the powder bed. The sidewall and top wall are configured to form a chamber portion of a turbulence chamber. The top wall has a vacuum exit opening that is configured to fluidly connect to a vacuum source. The sidewall has a plurality of sidewall inlet flow channels that extend from an inlet opening at an exterior side of the sidewall to an outlet opening at an interior side of the sidewall. A side exit channel is configured to extend along the top wall from a collector opening in communication with the chamber portion toward the vacuum exit opening.

20 Claims, 12 Drawing Sheets

(51) Int. Cl.
  *B22F 12/00* (2021.01)
  *B29C 64/255* (2017.01)
  *B29C 71/00* (2006.01)
  *B33Y 30/00* (2015.01)
  *B33Y 40/20* (2020.01)

(56) References Cited

U.S. PATENT DOCUMENTS

| | | | |
|---|---|---|---|
| 11,130,179 | B2 | 9/2021 | De Lajudie et al. |
| 11,247,390 | B2* | 2/2022 | Krol ................. B29C 64/393 |
| 11,583,930 | B2 | 2/2023 | Lin et al. |
| 2018/0126461 | A1* | 5/2018 | Buller ................. B29C 64/25 |
| 2021/0046519 | A1 | 2/2021 | Go et al. |
| 2022/0032545 | A1* | 2/2022 | Fey ................... B29C 64/35 |
| 2022/0227053 | A1* | 7/2022 | Van Nieuwenhove ................ B22F 10/68 |
| 2022/0331875 | A1* | 10/2022 | Halla ................. B33Y 40/00 |
| 2023/0001635 | A1* | 1/2023 | Garrido ............... B29C 64/25 |
| 2023/0036660 | A1* | 2/2023 | Dorini ............... B29C 64/364 |
| 2023/0098828 | A1* | 3/2023 | Schaede .............. B33Y 10/00 425/78 |
| 2023/0182394 | A1 | 6/2023 | Diosdado Borrego et al. |
| 2023/0226766 | A1 | 7/2023 | Vatani et al. |

FOREIGN PATENT DOCUMENTS

| | | | |
|---|---|---|---|
| EP | 2983895 A1 | 2/2016 | |
| WO | 2014167100 A1 | 10/2014 | |

\* cited by examiner

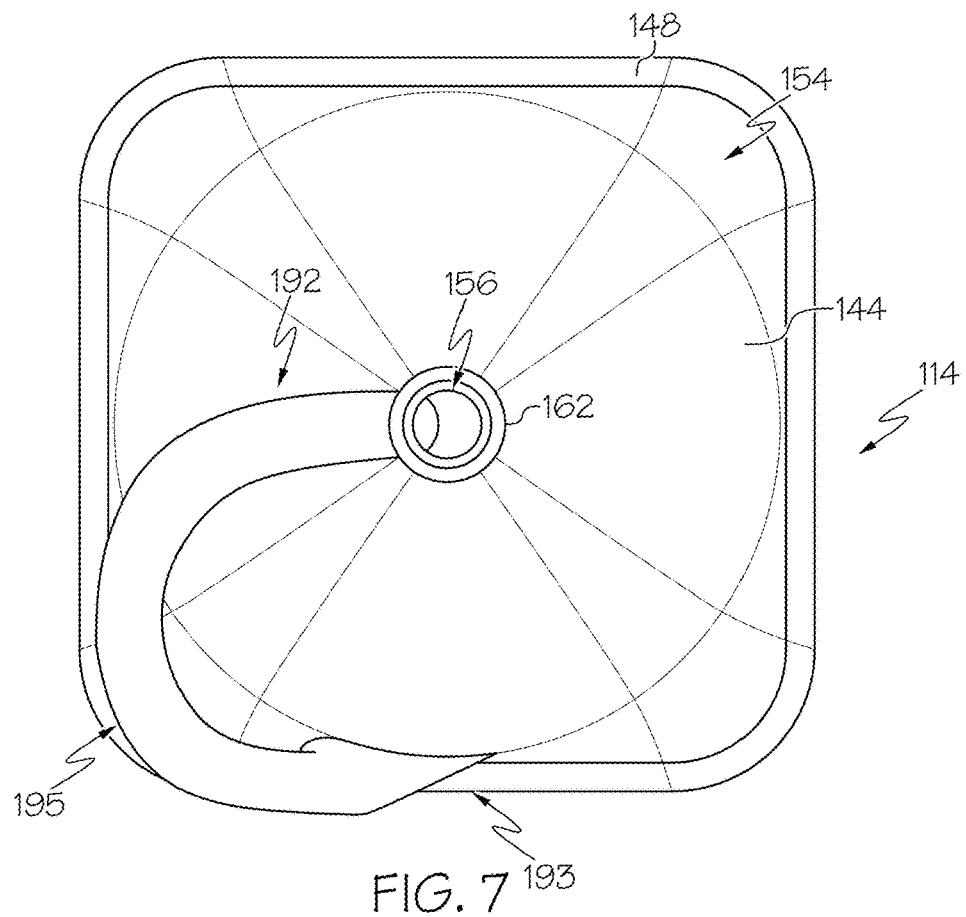
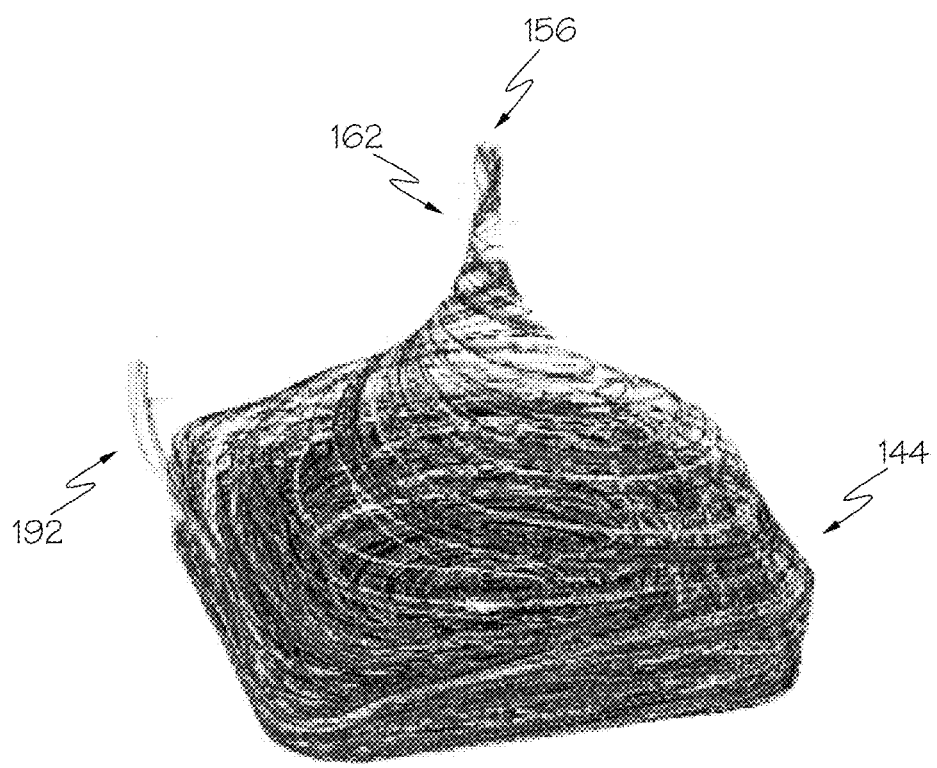
FIG. 7
FIG. 8

POWDER REMOVAL APPARATUSES FOR ADDITIVE MANUFACTURING APPARATUSES

BACKGROUND

Field

The present specification generally relates to additive manufacturing apparatuses and, more specifically, to powder removal apparatuses for additive manufacturing apparatuses.

Technical Background

Various additive manufacturing methods, including selective laser melting (SLS), direct metal laser melting (DMLM), and binder jet additive manufacturing, include selective fusion of powder in a powder bed to manufacture a three-dimensional (3D) object. However, upon completion of a build, the object is surrounded by loose powder, which may require a technician to manually remove the loose powder using their hands and/or a manually positioned vacuum. These processes can be time consuming, labor intensive, ergonomically challenging, leading to risk of powder contamination and potential production inefficiencies.

Accordingly, a need exists for alternative systems and assemblies for removing powder from a powder bed.

BRIEF DESCRIPTION OF THE DRAWINGS

FIG. 7 is a top view of the extraction housing of FIG. 4, according to one or more embodiments shown and described herein;

FIG. 8 illustrates a computer-generated simulation of powder particle trajectories in the extraction housing of FIG. 4 having a diameter of five microns during a powder removal process, according to one or more embodiments shown and described herein;

DETAILED DESCRIPTION

Figure 1:
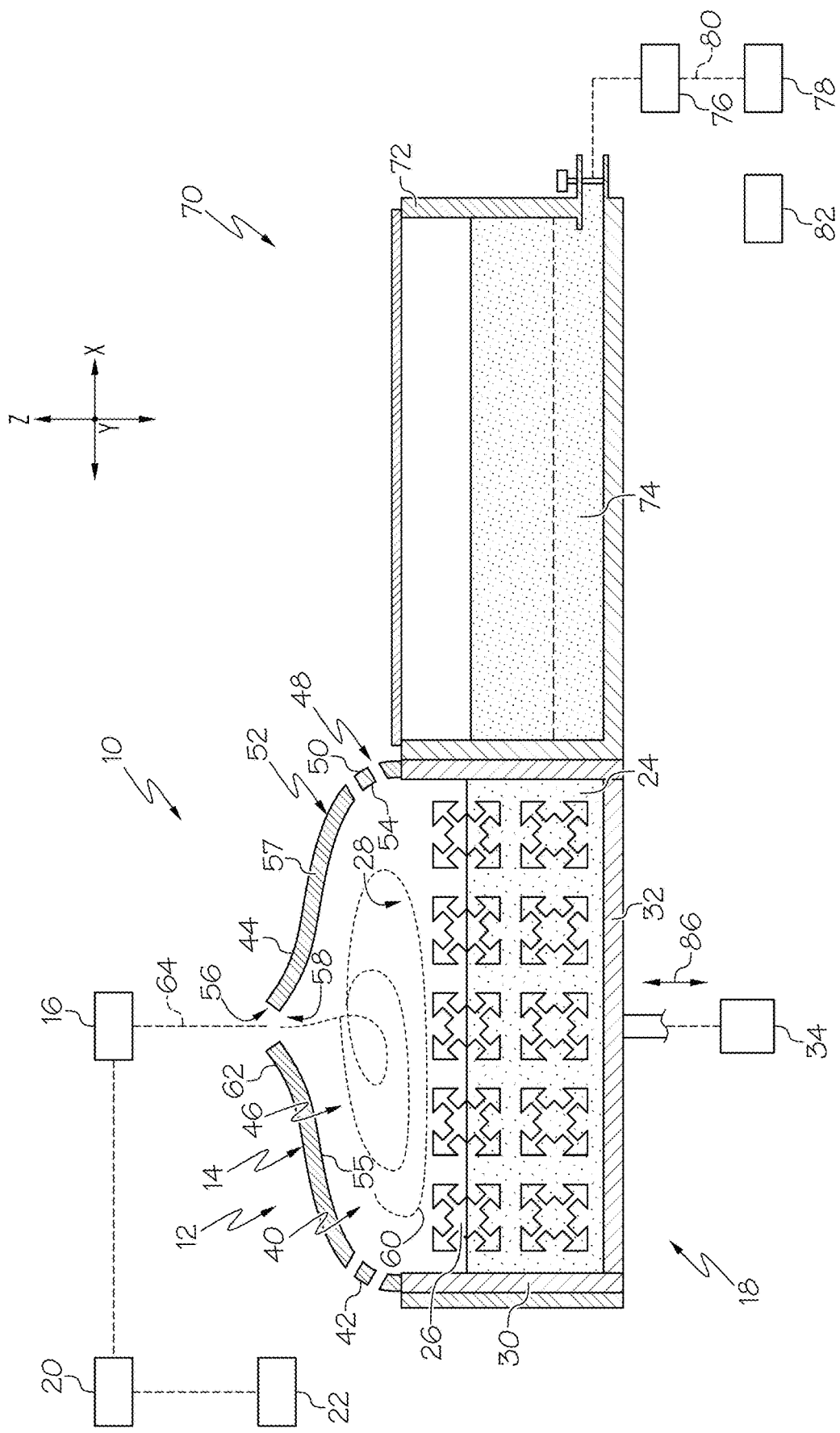
FIG. 1 is a schematic section view of a powder removal system including a build module and a powder removal apparatus including extraction housing, according to one or more embodiments shown and described herein.

Whenever possible, the same reference numerals will be used throughout the drawings to refer to the same or like parts. One embodiment of a powder removal system includes a build module that includes module sidewalls and a moveable build plate slidably coupled to the module sidewalls. A powder removal apparatus including an extraction housing is removably engaged with the module sidewalls of the build module and defines a turbulence chamber between the build module and the extraction housing. The extraction housing includes a sidewall comprising one or more sidewall inlet flow channels extending through the sidewall and in communication with an environment surrounding the extraction housing. The sidewall inlet flow channels extending through the sidewall and having inlets to draw fluid from the environment and outlets to deliver the fluid to the turbulence chamber. A top wall is coupled to the one or more sidewalls defining a portion of the turbulence chamber. In some embodiments, the top wall extends outward from the build module to a vacuum exit opening configured to connect to a vacuum source. In some embodiments, an exit channel may be in communication with the turbulence chamber and configured to collect and provide an exit passageway for powder to exit the turbulence chamber through an exit opening. Various embodiments of powder removal assemblies, powder removal apparatuses, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, upper, lower,—are made only with reference to the figures as drawn and are not intended to imply absolute orientation unless otherwise expressly stated.

As used herein, the singular forms "a," "an" and "the" include plural referents unless the context clearly dictates otherwise. Thus, for example, reference to "a" component includes aspects having two or more such components, unless the context clearly indicates otherwise.

Reference will now be made in detail to embodiments of powder removal apparatuses, and components thereof, examples of which are illustrated in the accompanying drawings. The powder removal apparatuses may be used with additive manufacturing apparatuses that may include a process chamber housing that houses a build platform onto which a powder material is delivered and an electron beam source or other print head that is used to fuse powder together layer-by-layer to form a three-dimensional structure out of two-dimensional layers.

As used herein, the term "three-dimensional structures" and the like refer generally to intended or actually fabricated three-dimensional configurations (e.g., of structural material or materials) that are intended to be used for a particular purpose. Such structures may be, for example, designed with the aid of a computer aided design (CAD) program.

As used herein, the term "two-dimensional structures" and the like refer generally to layers of the three-dimensional structure that when built, one over the other, form the three-dimensional structures. While referred to as "two-dimensional structures," it should be understood that each layer includes an accompanying thickness in a third dimension, albeit the structures have a relatively planar configuration compared to a fused stack of the two-dimensional structures that form the three-dimensional structures.

As used herein, the term "electron beam" refers to any charged particle beam. The sources of a charged particle beam can include an electron gun, a linear actuator, etc. The term "print head," sometimes referred to as an "inkjet print head" refers to a device used to deliver a binder that acts as an adhesive between powder layers.

Various embodiments of the additive manufacturing apparatuses relate to methods for producing three-dimensional objects by layering two-dimensional structures one on the other by powder additive manufacturing, such as using electron beam melting (EBM), selective laser sintering (SLS), selective laser melting (SLM) and/or metal binder jetting (MBJ). In each of the additive forming processes, the object being printed is supported with a bed of powder and is removed from the unbound powder once completed. It should be noted, that, in electron beam forming three-dimensional structures, unbound powder may be relatively dry and loose compared to MBJ processes. In MBJ processes, the unbound powder may be somewhat compacted or bound together forming relatively large, loose particles (e.g., at least about 10 μm).

Referring to FIG. 1, a powder removal system 10 includes a powder removal apparatus 12 with an extraction housing 14 and a vacuum pump 16 fluidically coupled to the extraction housing 14. The powder removal system 10 may further include a build module 18, a powder separator 20 and a powder container 22.

The build module 18 may be any structure which may be used with an additive manufacturing apparatus (e.g., SLM, DMLM, binder jet, etc.) in which a powder bed including loose (i.e., unbound) powder 24 (e.g., metal, ceramic, and/or plastic particles) may be positioned for manufacturing of a three-dimensional object 26 via selective fusion of the powder 24. For example, the build module 18 may define a chamber 28 in which the powder 24 is positioned. To define the chamber 28, the build module 18 may generally include one or more module sidewalls 30 and a moveable build plate 32 which may be slidably coupled to the one or more module sidewalls 30. An actuator 34 (e.g., a linear actuator) may engage the moveable build plate 32 to move the moveable build plate 32 along a vertical axis (e.g., in the +/−Z direction of the depicted coordinate axes). For example, during manufacturing, the build module 18 may be positioned in proximity to a fusion device (e.g., a laser or print head; not depicted). A layer of powder 24 may be deposited on the moveable build plate 32 and the fusion device may selectively fuse portions of the powder 24 to form a portion or layer of a printed object 26. The actuator 34 may move the moveable build plate 32 down (i.e., in the −Z direction of the depicted coordinate axes) and more powder 24 may be deposited on the previous layer to allow for additional powder 24 to be fused to build the desired printed object 26 layer by layer. Once the desired printed object 26 is built, the surrounding loose powder 24 may be removed from the build module 18. As noted above, this may be done using brushes, shovels, hands, and or hand-positioned vacuums. However, such processes may be time-consuming and/or tedious, leading to manufacturing inefficiencies.

To aid in removal of the loose powder 24 from the build module 18, the extraction housing 14 may be removably engaged with the build module 18 or vice versa. For example, the extraction housing 14 may be engaged with the module sidewalls 30 of the build module 18. Such engagement may be direct or indirect. For example, such as illustrated in FIG. 1, the extraction housing 14 may rest directly on the module sidewalls 30. The extraction housing 14, when engaged with the build module 18, defines a turbulence chamber 40 between the extraction housing 14 and the build module 18. During powder removal, in some embodiments, the moveable build plate 32 moves vertically to decrease a volume of the turbulence chamber 40 as the powder 24 is removed.

The extraction housing 14 of the powder removal apparatus 12 generally includes sidewalls 42 and a top wall 44 that extends between the sidewalls 42 defining a portion of the turbulence chamber 40. The sidewalls 42 may extend relatively more vertically than most of the top wall 44 forming a chamber portion 46 of the turbulence chamber 40. The sidewalls 42 include sidewall inlet flow channels 48 that extend from an inlet opening 50 at an exterior side 52 of the sidewalls 42 to an outlet opening 54 at an interior side 55 of the sidewalls 42. The shape of the sidewalls 42 may be selected to be generally the same as the shape of the module sidewalls of the build module 18 so that the extraction housing 14 can mate with the build module 18.

The top wall 44 extends between the sidewalls 42 and includes a narrowing portion 57 that covers most of a footprint of the chamber portion 46. In some embodiments, the top wall 44 extends outward away from the build module 18 at a necked-down pipe structure 62 to a vacuum exit opening 56 forming an inverted funnel-shape that is configured to connect to the vacuum pump 16. In some embodiments, an exit channel 58 may be in communication with the turbulence chamber 40 and configured to collect and provide an exit passageway, also represented by element 58, for powder 24 to exit the turbulence chamber 40 through the exit opening 56.

As will be described in greater detail below, the sidewall inlet flow channels 48 may be sized to draw in outside fluid to generate a vortex 60 within the turbulence chamber 40 due to application of a negative pressure by the vacuum pump 16. The sidewall inlet flow channels 48 may also be shaped to facilitate the formation of the vortex 60 in that they may extend oblique to horizontal (i.e., oblique to the X axis) and slant downward (i.e., oblique to the Z axis) toward the build module 18. The sidewall inlet flow channels 48 may also extend oblique to the Y axis, which may help generate a swirling fluid flow.

The one or more sidewalls 42 may be sealed to the module sidewalls 30 which can provide a gas-tight interface. For example, sealing material (e.g., a polymer strip) may be coupled to a bottom of the sidewalls 42 to provide a seal. Maintaining a seal between build module 18 and the extraction housing 14 may inhibit fluid leakages and/or maintain a desired environment within the build module 18. For example, in some embodiments, the powder 24 may be a reactive material, accordingly it may be desirable to maintain an inert environment within the turbulence chamber 40.

Still referring to FIG. 1, the top wall 44 may define the pipe structure 62 which provides fluidic communication into the turbulence chamber 40 with the vacuum pump 16. For example, one or more fluid conduits 64 (e.g., hose, piping, etc.), represented via dashed lines, may fluidically couple the vacuum exit opening 56 to the vacuum pump 16. The vacuum pump 16 may be operated to pull fluid (e.g., air, inert gas, etc.) and loose powder 24 out of the turbulence chamber 40 through the vacuum exit opening 56, leaving the printed object 26 positioned on the moveable build plate 32. The vacuum exit opening 56 may be sized and shaped to provide a desired flow rate out the turbulence chamber 40. In some embodiments, the vacuum exit opening 56 may include a plurality of vacuum ports. In some embodiments, a vacuum exit opening may be positioned within the one or more sidewalls 42 instead of, or in addition to, the top wall 44.

The vacuum pump 16 may be any type of commercially available vacuum pump 16 which provides sufficient gas volume flow (e.g., blowers, claw pumps, rotary vane pump, etc.) providing a negative pressure within the turbulence chamber 40. As used herein, the terms "negative pressure," "suction," "vacuum" and "partial vacuum" may be used interchangeably and refer to a force over an area produced by a difference in pressure. Pressure may be referred to as "negative" in reference to atmospheric pressure (i.e., gauge pressure). As should be understood, the volume flow may depend on a plurality of factors, including but not limited, system constraints, the size of the build, powder type, etc. The vacuum pump 16 is fluidly coupled to the vacuum exit opening 56 via the one or more fluid conduits 64. The powder separator 20 may be positioned along the one or more fluid conduits 64 for separating powder 24 from the fluid stream prior to entering the vacuum pump 16 and being recirculated through the extraction housing 14. The powder separator 20 may be any suitable powder separator 20 such as, but not limited to, cyclonic or filter based powder separators. The powder separator 20 may direct the powder 24 separated from the fluid stream being pulled from the turbulence chamber 40 into the powder container 22, which may be any type of receptacle suitable for holding powder 24. It is contemplated that the separated powder 24 within the receptacle may be recycled in further printing processes, disposed of, or the like. In some embodiments, the powder 24 may be further separated into powder for recycling and powder for disposal using, for example, a sieve or filter.

In some embodiments, a bath apparatus 70 may be provided as part of the powder removal system 10 that includes a tank 72 and a solvent 74 suitable for removing excess powder 24. For example, the bath apparatus 70 may be a sonicator that ultrasonic vibration to cause the powder 24 to release from the printed object 26. A powder separator 76 and powder container 78 may be in communication with the tank 72 to separate and collect the powder 24 for reuse. The solvent 74 may be recycled to the tank 72 along line 80 for reuse. In some embodiments, an oven 82 may be provided for drying and/or sintered the printed object 26.

After a printed object 26 is completed, the powder removal apparatus 12 may be placed over and/or in contact with the build module 18. Placement of the powder removal apparatus 12 may be manual or automated via one or more positioning actuators (e.g., a robotic arm, or the like). In some embodiments, placement of the powder removal apparatus 12 may be automatic, via a control unit, in response to completion of a printed object 26. Once positioned, the vacuum pump 16 may be operated via the control unit and/or an input from a user (e.g., such as through one or more user interfaces including but not limited to touchscreens, buttons, toggles, microphones, or the like) communicatively coupled to the control unit. Operation of the vacuum pump 16 may draw a fluid stream from the turbulence chamber 40 through the vacuum exit opening 56. Drawing a fluid stream from the turbulence chamber 40, in turn, draws one or more fluid streams into the sidewall inlet flow channels 48, where the one or more fluid streams impinge the powder 24. Impingement of the powder 24 causes turbulence within the turbulence chamber 40, and entrains powder 24 within the one or more fluid streams. The entrained powder 24 may then be removed from the turbulence chamber 40 via the vacuum pump 16 through the vacuum exit opening 56.

In some embodiments, the powder removal system 10 may be a closed system, where fluid is recirculated through the extraction housing 14 to maintain an inert environment. For example, fluid flowing to the vacuum pump 16 may be returned to the surrounding environment where it can be recirculated through the extraction housing 14 and turbulence chamber 40. In other embodiments, atmospheric fluid may be drawn into the turbulence chamber 40. In yet further embodiments, compressed fluid may be provided to the surrounding environment to supplement flow created via the vacuum pump 16. Fluids can include, but are not limited to, air, nitrogen, argon, or the like. In yet further embodiments, it is contemplated that there may be multiple intake fluid ports and/or vacuum ports which may be independently plumbed to allow for selective fluid flow profiles through the extraction housing 14 and the turbulence chamber 40.

As noted above, the velocity of the fluid entering through sidewall inlet flow channels 48 causes the powder 24 within the build module 18 to be agitated and entrained within the one or more fluid streams being pulled through the extraction housing 14, resulting in powder 24 being removed from turbulence chamber 40 through the vacuum exit opening 56. During powder removal, the moveable build plate 32 may be moved up as represented by arrows 86, to allow substantially all of the loose powder 24 within the turbulence chamber 40 to be impinged via one or more fluid streams entering the turbulence chamber 40 through the sidewall inlet flow channels 48, entrained within the one or more fluid streams, and removed through the vacuum exit opening 56. The moveable build plate 32 may move continuously during powder removal in the +Z direction of the depicted coordinate axes until the majority or substantially all of the powder 24 is removed and/or the printed object 26 is positioned entirely within the extraction housing 14. Accordingly, the extraction housing 14 may have an internal height equal to greater than a height of the printed object 26 or a height that is equal to a maximum depth of the build module 18.

Once powder removal is complete or substantially complete, the powder removal apparatus 12 may be removed from the build module 18 to allow for further processing and/or removal of the printed object 26. In some embodiments, the powder removal apparatus 12 may be automatically removed via one or more positioning actuators controlled via a control unit. In yet further embodiments, after powder removal, the build module 18 may be removed from the powder removal apparatus 12 and moved to one or more processing stations.

It is noted that in the above embodiment, the powder 24 is drawn via vacuum pressure through the top wall 44. However, in some embodiments, the powder 24 may be drawn via vacuum pressure through the one or more sidewalls 42. In some embodiments, flow may instead be generated via a compressor that delivers compressed gas through the one or more sidewall inlet fluid flow channels 48. For example, a compressor may force fluid into the sidewall inlet fluid flow channels 48. Suction via the vacuum pump 16 and/or forced pressure from the compressor may draw the fluid out of the turbulence chamber 40 through the vacuum exit opening 56.

Figure 2:
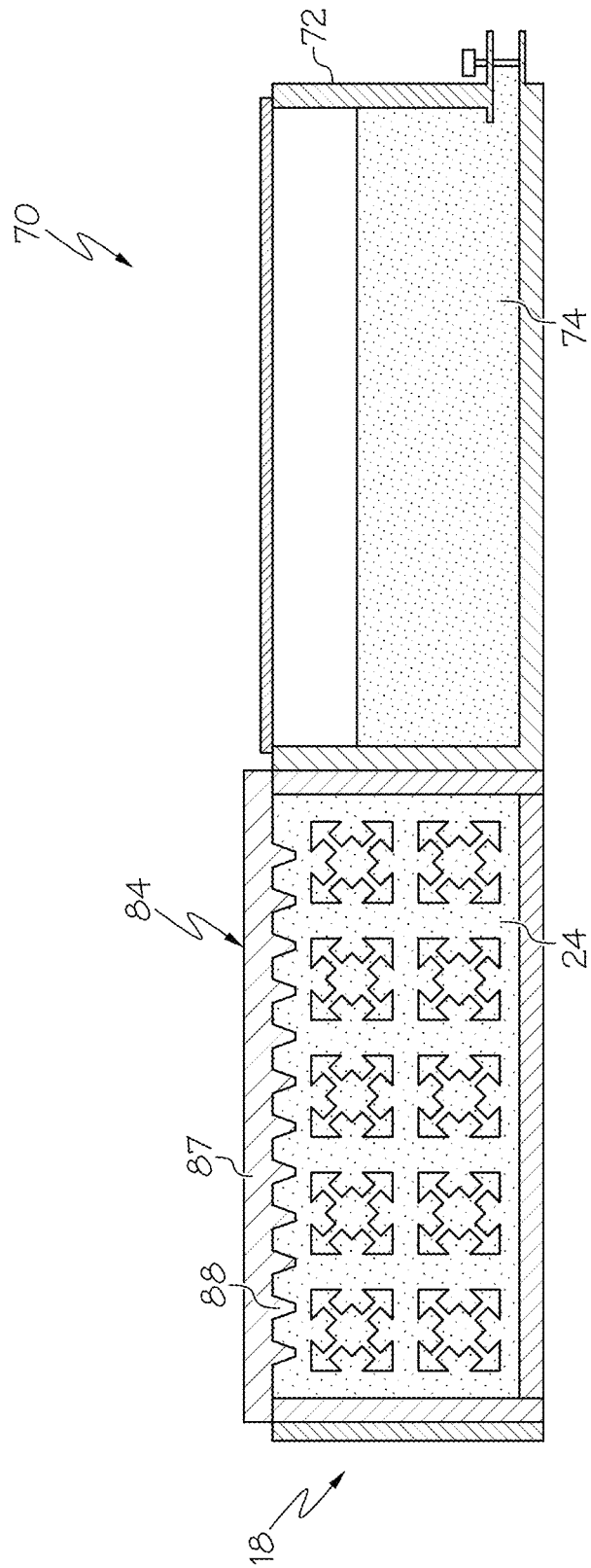
FIG. 2 is a schematic section view of a powder removal system including a powder breaking device, according to one or more embodiments shown and described herein.
Figure 3:
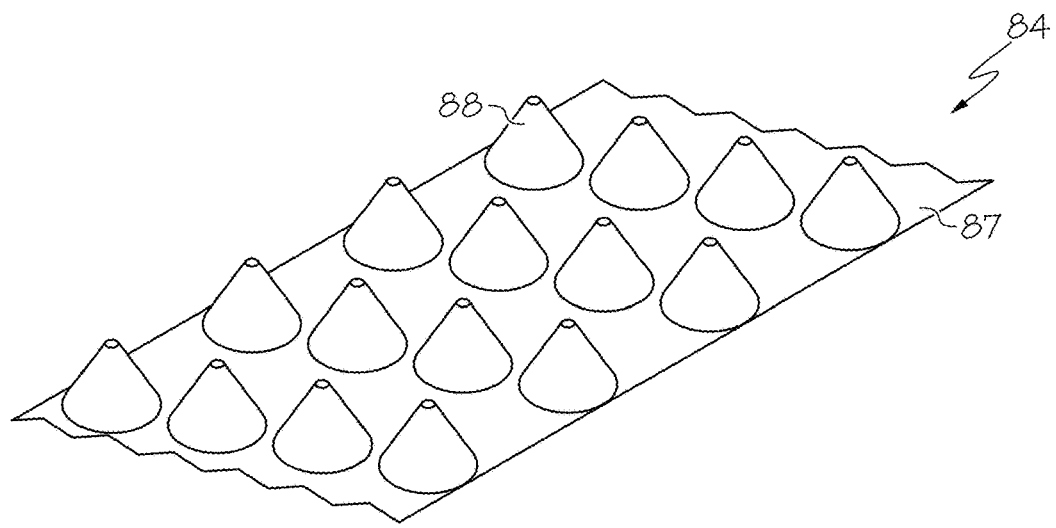
FIG. 3 is a detailed view of the powder breaking device of FIG. 2, according to one or more embodiments shown and described herein.

Referring briefly to FIG. 2, in some embodiments, a powder breaking device 84 may be used to initially break up powder 24 in the build module 18. Referring also to FIG. 3, the powder breaking device 84 may include a base layer 87 with an array of projections 88 (e.g., cones) that can penetrate a top layer of the powder 24 and be used to break up the surface of the powder 24. This breaking step can aid in initiating powder 24 removal using the powder removal apparatus 12.

Without wishing to be bound by theory, it has been discovered that smaller powder particles (e.g., less than 25 microns) can readily escape vertically in the Z-direction through the pipe structure 62 due to the negative pressure supplied by the vacuum pump 16. Larger particles (e.g., greater than 25 microns) may tend to not be pulled vertically through the pipe structure 62 and may, instead, spin around the turbulence chamber 40, largely in an X-Y direction. This may be caused by the negative pressure, the vortex 60 that is created therein, and the weight of the larger powder particles. It should be noted that the vortex speed in the X-Y direction is generally higher than the speed in the Z-direction creating a centrifugal effect. It can be desirable to enhance and utilize this centrifugal effect to remove the larger powder particles from the turbulence chamber 40.

Figure 4:
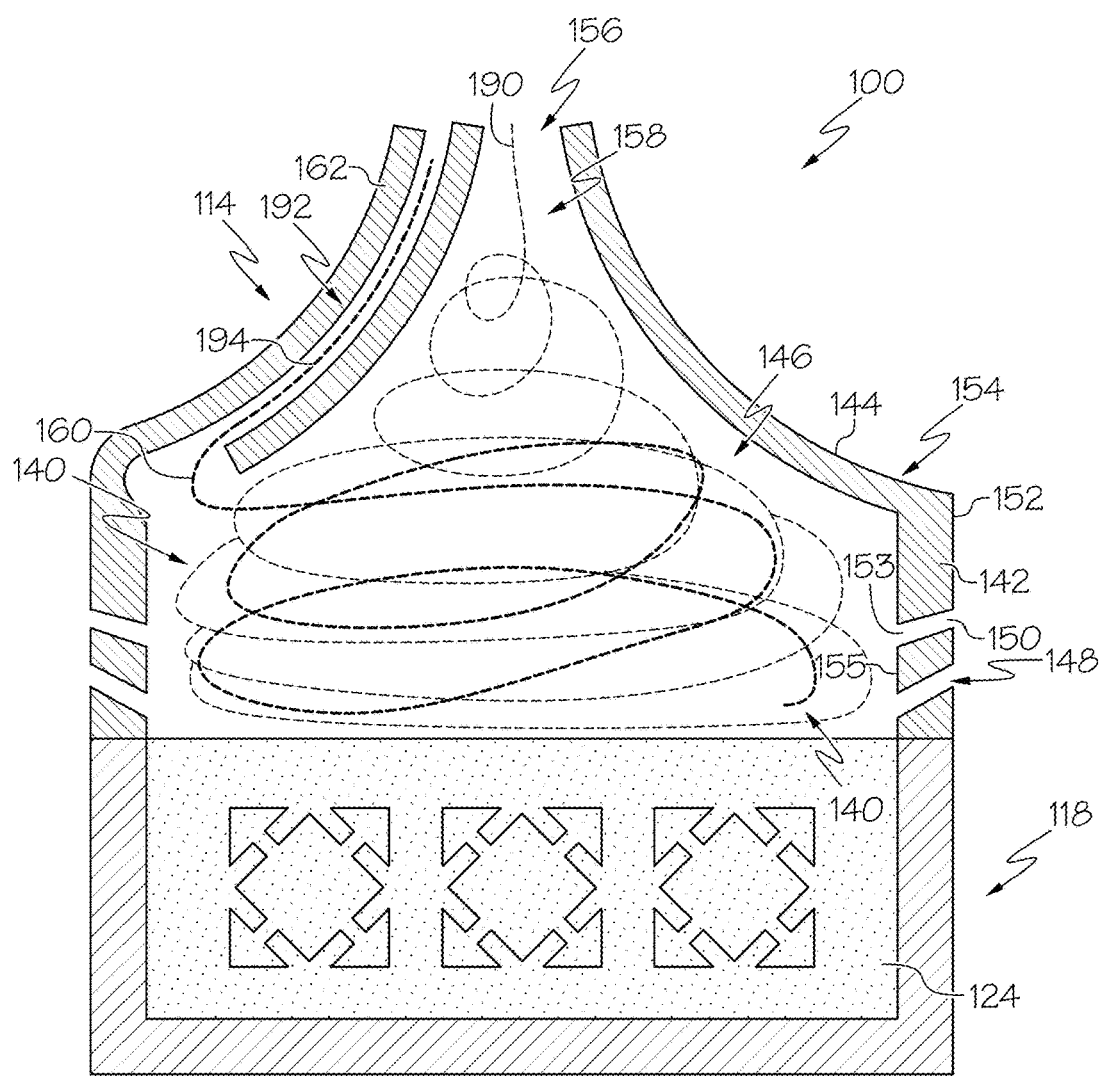
FIG. 4 is a schematic section view of another powder removal system including a build module and a powder removal apparatus including extraction housing, according to one or more embodiments shown and described herein.

Referring to FIG. 4, another powder removal apparatus 100 is illustrated and includes an extraction housing 114. The extraction housing 114 includes many features similar to the extraction housing 14 described above with reference to FIG. 1. The extraction housing 114 includes sidewalls 142 that are configured to seal upon a build module 118. A top wall 144 extends between the sidewalls 142 defining a turbulence chamber 140. The sidewalls 142 include sidewall inlet flow channels 148 that extend from an inlet opening 150 at an exterior side 152 of the sidewalls 142 to an outlet opening 153 at an interior side 155 of the sidewalls 142.

As above, the top wall 144 extends between the sidewalls 142 and includes a narrowing portion 154 that covers most of a footprint of chamber portion 146 and extends inward from the sidewalls 142 toward a centerline of the powder removal apparatus 100. In some embodiments, the top wall 144 extends upward away from the build module 118 at a necked-down pipe structure 162 to a vacuum exit opening 156 forming an inverted funnel-shape that is configured to connect to a vacuum pump. In some embodiments, an exit channel 158 may be in communication with the turbulence chamber 140 and configured to collect and provide an exit passageway, represented by element 158, for smaller particles of powder 124 to exit the turbulence chamber 140 through the exit opening 156, as represented by dashed line 190.

Figure 5:
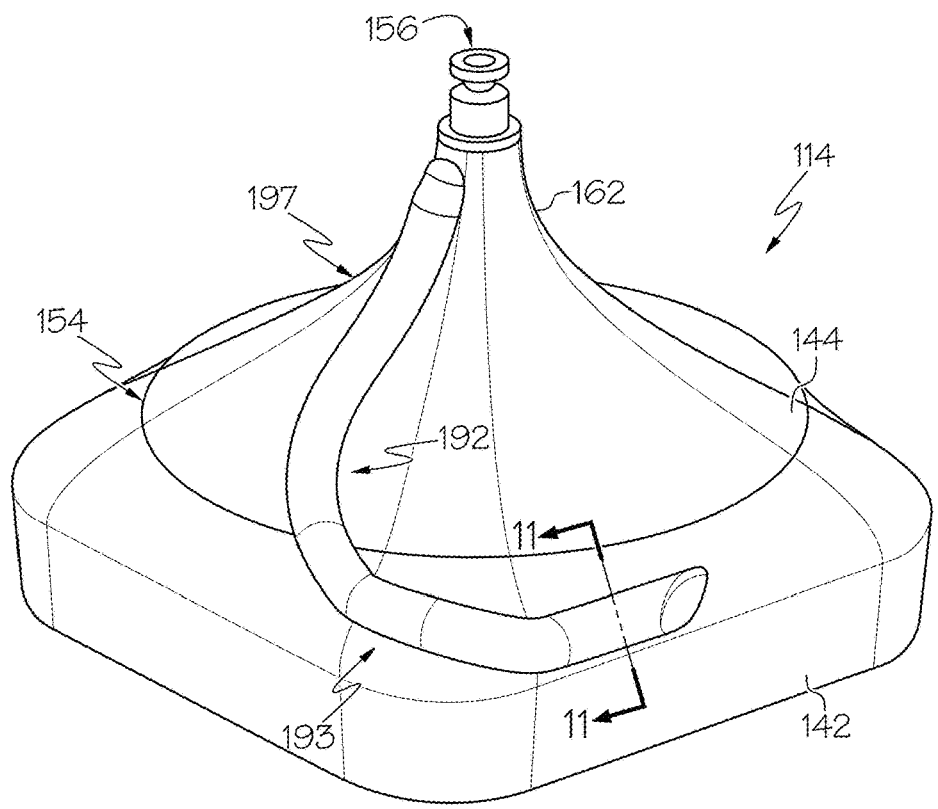
FIG. 5 is a perspective view of the extraction housing of FIG. 4, according to one or more embodiments shown and described herein.
Figure 6:
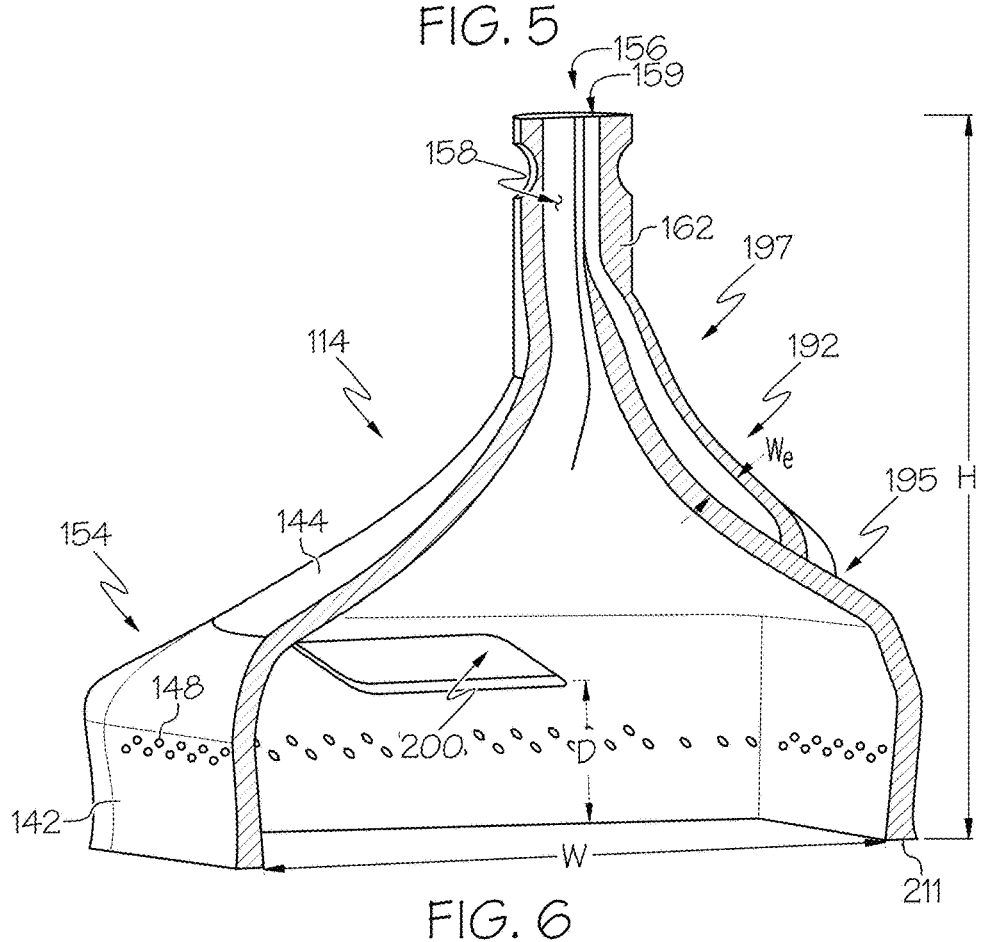
FIG. 6 is a section view of the extraction housing of FIG. 4, according to one or more embodiments shown and described herein.

In the illustrated embodiment, the extraction housing 114 further includes a side exit channel 192 that can collect larger particles of powder 124, as represented by dashed line 194, that are carried about the turbulence chamber 140 due to centrifugal effect, and that are not carried through the vacuum exit opening 156 due to their mass. FIGS. 5-7 illustrate a more detailed view of the extraction housing 114 including the side exit channel 192. As can be seen, the side exit channel 192 can be formed with a curved shape that, to some degree, mimics the shape of the vortex 160 (FIG. 4) that is formed using the sidewall inlet flow channels 148 and negative pressure supplied by the vacuum pump, as described above. In some embodiments, the vacuum pump may supply negative pressure to both the necked-down pipe structure 162 and the side exit channel 192 to help draw particles of powder 124 through both exits.

The side exit channel 192 extends from a side collector opening 200 located in top wall 144, along an outer perimeter of narrowing portion 154 and vertically up the necked-down pipe structure 162 toward the vacuum exit opening 156. The top wall 144 may be smooth and flush with the side collector opening 200 to aid in particle collection. As can be seen in FIGS. 5 and 7, the shape of the side exit channel 192 is somewhat U-shaped to take advantage of the centrifugal forces that are created within the turbulence chamber 140 (FIG. 4). The side exit channel 192 may form a closed fluid pathway between the collector opening 200 and vacuum exit opening 156.

In particular, a lower portion 193 of the side exit channel 192 may extend horizontally outward from the side collector opening 200 and around a preselected distance (e.g., between 10 percent and 40 percent) of the outer perimeter of the narrowing portion 154. In some embodiments, the lower portion 193 of the side exit channel 192 may extend around an outer perimeter of one or more sidewalls 142, depending, at least in part, on the shape and size of the powder removal apparatus 100. The side exit channel 192 turns upward along a turn portion 195 toward the necked-down pipe structure 162 and then travels vertically along the necked-down pipe structure 162 along a vertical portion 197 and toward the vacuum exit opening 156. As shown in FIG. 6, the side exit channel 192 can extend vertically alongside the exit passageway 158 without intersecting the exit passageway 158 to another vacuum exit opening 159. In other embodiments, the side exit channel 192 may intersect the exit passageway 158 and share the vacuum exit opening 156. The shape of the side exit channel 192 is configured in such a way that spinning powder particles can readily exit the turbulence chamber 140. Further, the shape of the side exit channel 192 may provide a smooth transition along the length of the side exit channel 192 with no abrupt changes in path toward the vertical portion 197, which can aid in particle removal.

An overall length of the side exit channel 192 may be related to a maximum width W of the extraction housing 114, which is measured between opposite sides of the one or more sidewalls 142. As one example, for the width W, a height H of the extraction housing 114 may be 2W and the overall length of the side exit channel 192 may be between 2.5W and 3W. An inner diameter or width of the side exit channel 192 may also be related to the width W of the extraction housing 114. For example, referring briefly to FIG. 11, the width We of the side exit channel 192 at the side collector opening 200, referred to as the maximum width of the side exit channel 192, may be between 0.3W and 0.5W. In some embodiments, as shown by FIG. 6, the width We may decrease along the length of the side exit channel 192 from the side collector opening 200 toward the vacuum exit opening 156 to aid in particle removal. For example, the width We may taper to 0.5 inch or less. Further, a vertical distance D of the side collector opening 200 from a bottom edge 211 of the extraction housing 114 may be between 0.3W and 0.6W.

Figure 9:
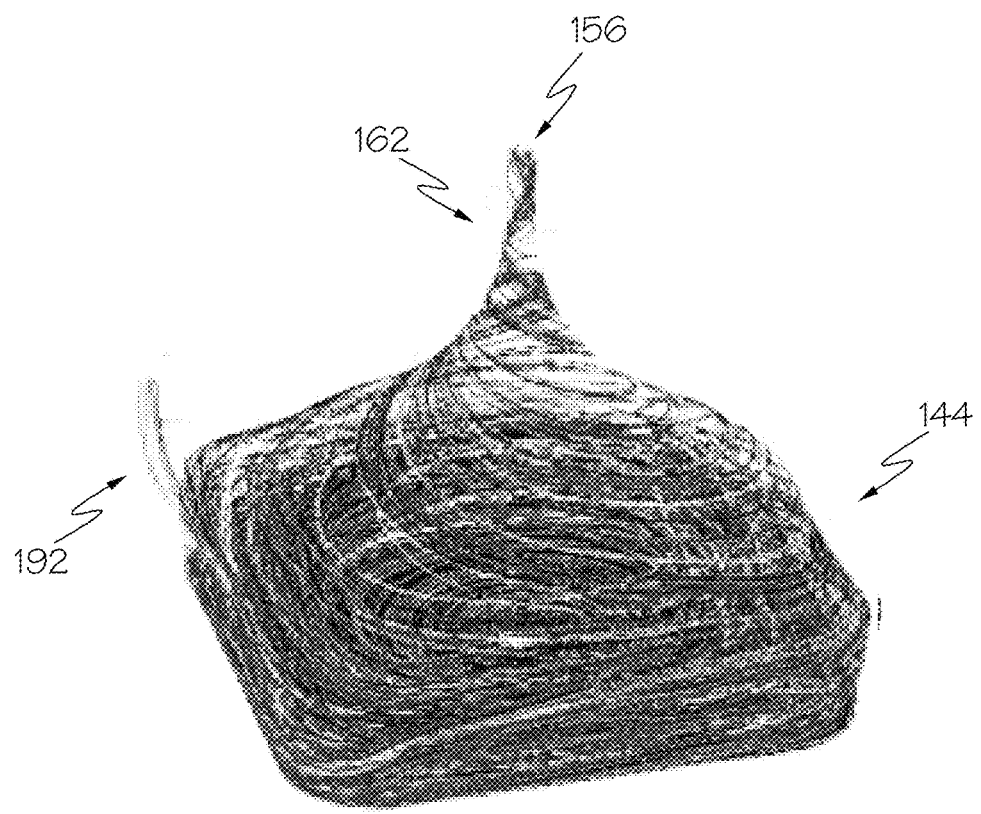
FIG. 9 illustrates a computer-generated simulation of powder particle trajectories in the extraction housing of FIG. 4 having a diameter of 10 microns during a powder removal process, according to one or more embodiments shown and described herein.
Figure 10:
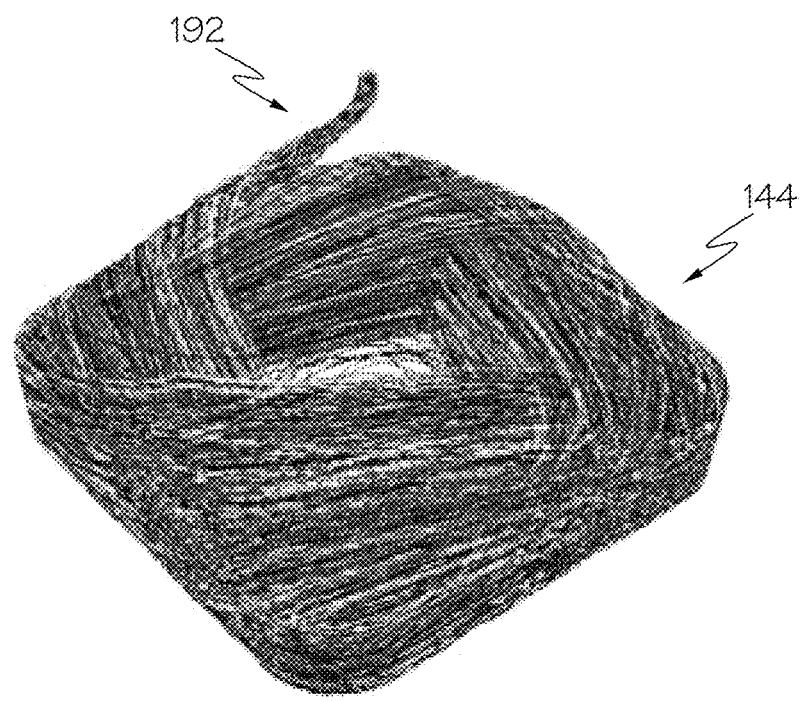
FIG. 10 illustrates a computer-generated simulation of powder particle trajectories in the extraction housing of FIG. 4 having a diameter of 50 microns during a powder removal process, according to one or more embodiments shown and described herein.

FIGS. 8-10 show computer-generated simulations of powder particle trajectories of different sizes within the extraction housing 114, in particular, powder having powder size diameters of 5 microns, 10 microns and 50 microns, respectively. As can be seen in FIGS. 8 and 9, the smaller size particles having diameters of 5 and 10 microns exit the turbulence chamber 140 vertically, primarily through the vacuum exit opening 156. A smaller percentage of the powder may travel up the side exit channel 192. Referring to FIG. 10, the larger size particles having diameters of 50 microns exit primarily through the side exit channel 192 utilizing the centrifugal effect and overall shape of the side exit channel 192.

Figure 11:
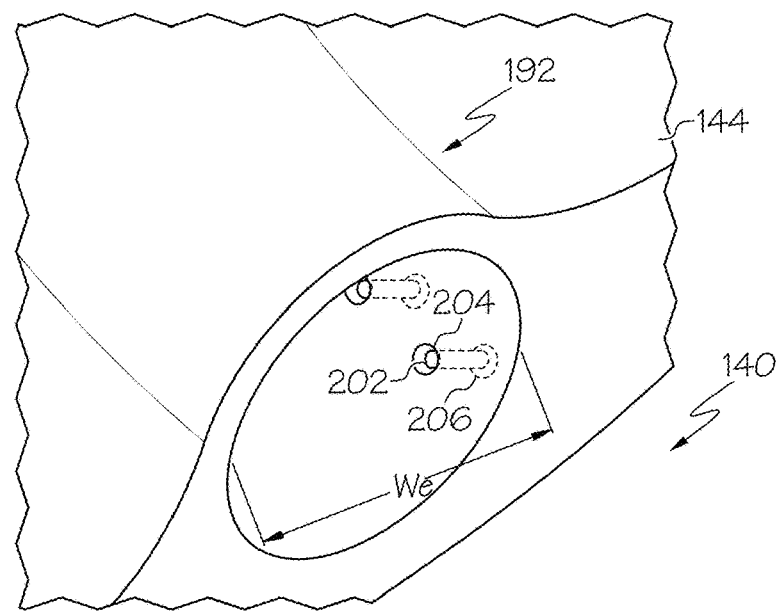
FIG. 11 illustrates a detailed view showing a side exit channel of the extraction housing along line 11-11 of FIG. 5, according to one or more embodiments shown and described herein.

Referring to FIG. 11, an embodiment with additional inlet flow channels 202 is shown. The inlet flow channels 202 through top wall 144 may be introduced to alter the flow pattern of the gas within the turbulence chamber 140. In the example of FIG. 11, top inlet flow channels 202 can be provided along the side exit channel 192 that have an opening 204 in communication with the side exit channel 192 and an opening 206 in communication with the turbulence chamber 140. The top inlet flow channels 202 can be used to redirect the vortex that is formed within the turbulence chamber 140. As can be seen, the top inlet flow channels 202 can be provided in an array of equally spaced top inlet flow channels 202; however, any other suitable arrangement of the inlet flow channels 202 may be used, such as unequally spaced flow channels 202 and/or groupings of flow channels 202. The top inlet flow channels 202 may also be provided at an oblique angle to the sidewall inlet flow channels 148 to provide the desired alteration of the vortex flow path.

Figure 12:
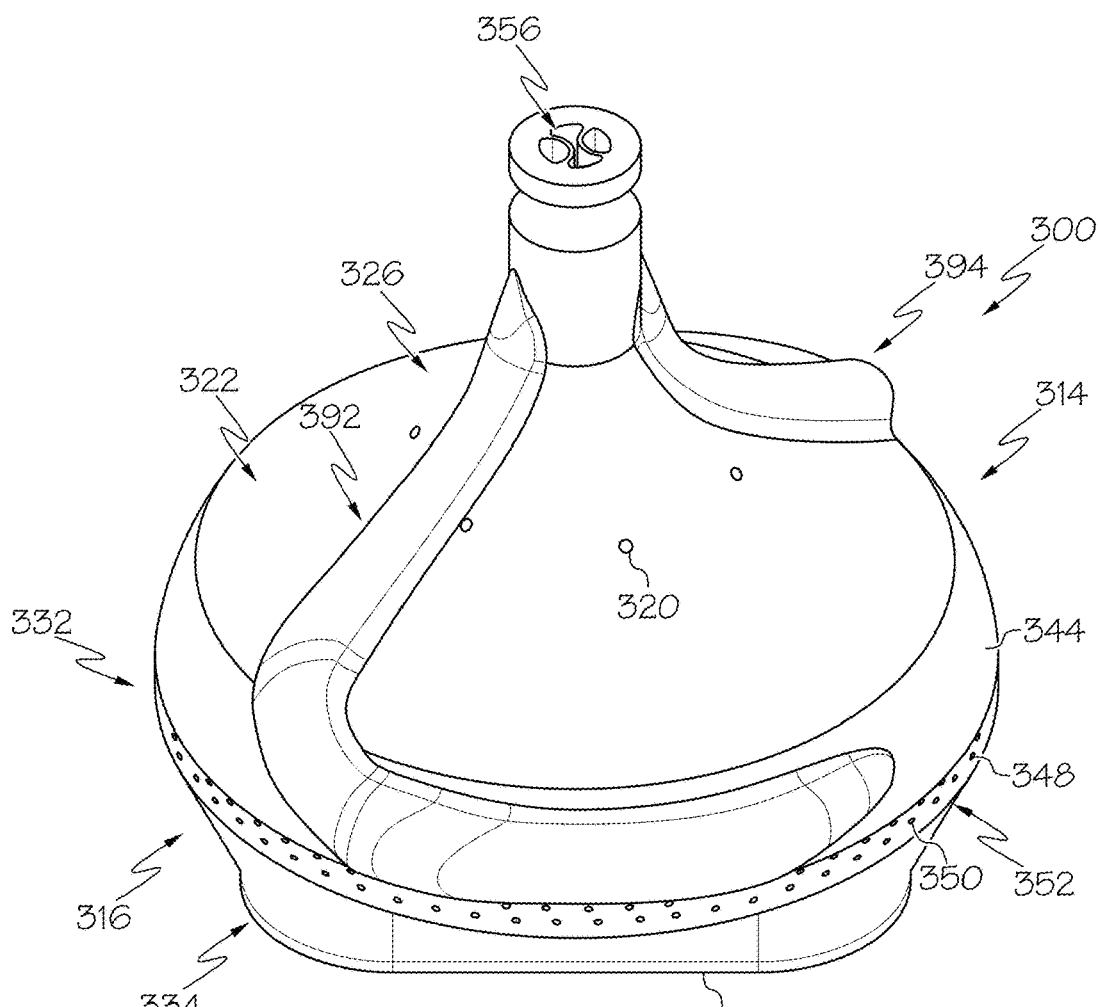
FIG. 12 illustrates a perspective view of another embodiment of an extraction housing, according to one or more embodiments shown and described herein.
Figure 13:
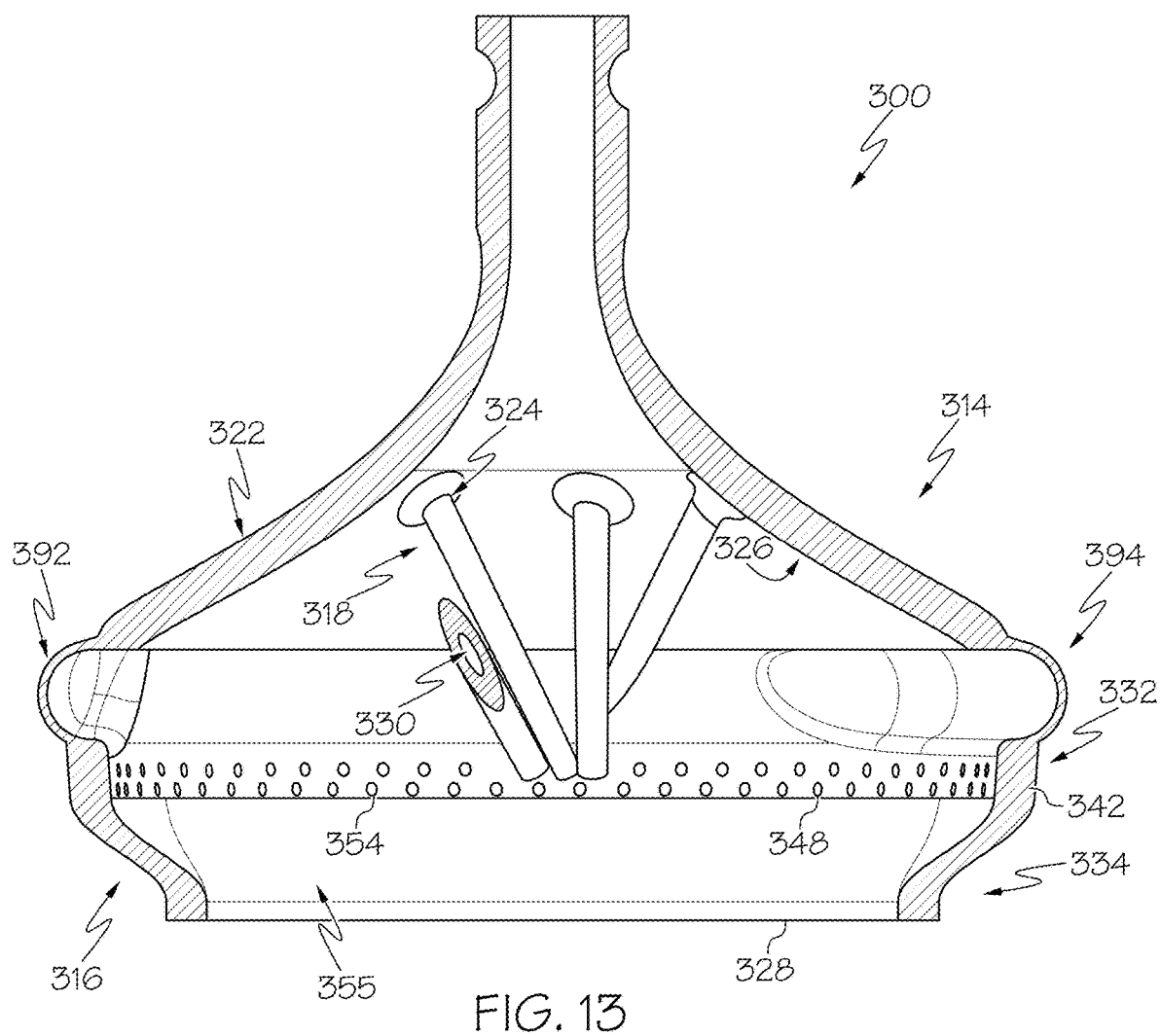
FIG. 13 illustrates a section view of the extraction housing of FIG. 12, according to one or more embodiments shown and described herein.

Referring now to FIGS. 12 and 13, another embodiment of a powder removal apparatus 300 includes an extraction housing 314 with many features similar to those described above with reference to FIGS. 4-7 including a sidewall 342 that is configured to seal upon a build module. A top wall 344 extends between opposite sides of the sidewall 342 that can define part of a turbulence chamber. The sidewall 342 includes sidewall inlet flow channels 348 that extend from an inlet opening 350 at an exterior side 352 of the sidewall 342 to an outlet opening 354 at an interior side 355 of the sidewall 342.

In this embodiment, the extraction housing 314 includes multiple side exit channels 392 and 394. The side exit channels 392 and 394 can collect larger particles of powder that are carried about the turbulence chamber due to centrifugal effect, as discussed above. The sidewall 342 may be provided with an outward tilt portion 316 that extends outward from a centerline of the extraction housing 314 that can encourage upward movement of the particles toward the side exit channels 392 and 394 during use. The sidewall 342 may also be formed with a rounded portion 332 (e.g., circular) in cross-sectional shape to encourage vortex flow and a more rectangular portion 334 or any other suitable shapes to fit around certain build shapes and to engage various build chambers.

The extraction housing 314 may be provided with purge nozzles 318 (FIG. 13). The purge nozzles 318 may be formed as tubes that extend inward from inlet openings 320 (FIG. 12) at an exterior side 322 of the top wall 344 to outlet openings 324 at an interior side 326 of the top wall 344 (FIG. 13). The purge nozzles 318 can be any suitable length, but in the illustrated example, terminate spaced-above a bottom edge 328 of the extraction housing 314 and are arranged at an oblique angle to the vertical centerline of the extraction housing 314. The purge nozzles 318 can be provided to supply fluid to a center of the vortex. The vortex that is created may have its strongest flow along the sidewall 342 and the purge nozzles 318 can provide added scrubbing fluid flow directly at the center of the vortex to loosen powder. As with the sidewall inlet flow channels 348, fluid can be drawn through passageways 330 into the turbulence chamber using a vacuum pump that is fluidly connected to vacuum exit opening 356.

Figure 14:
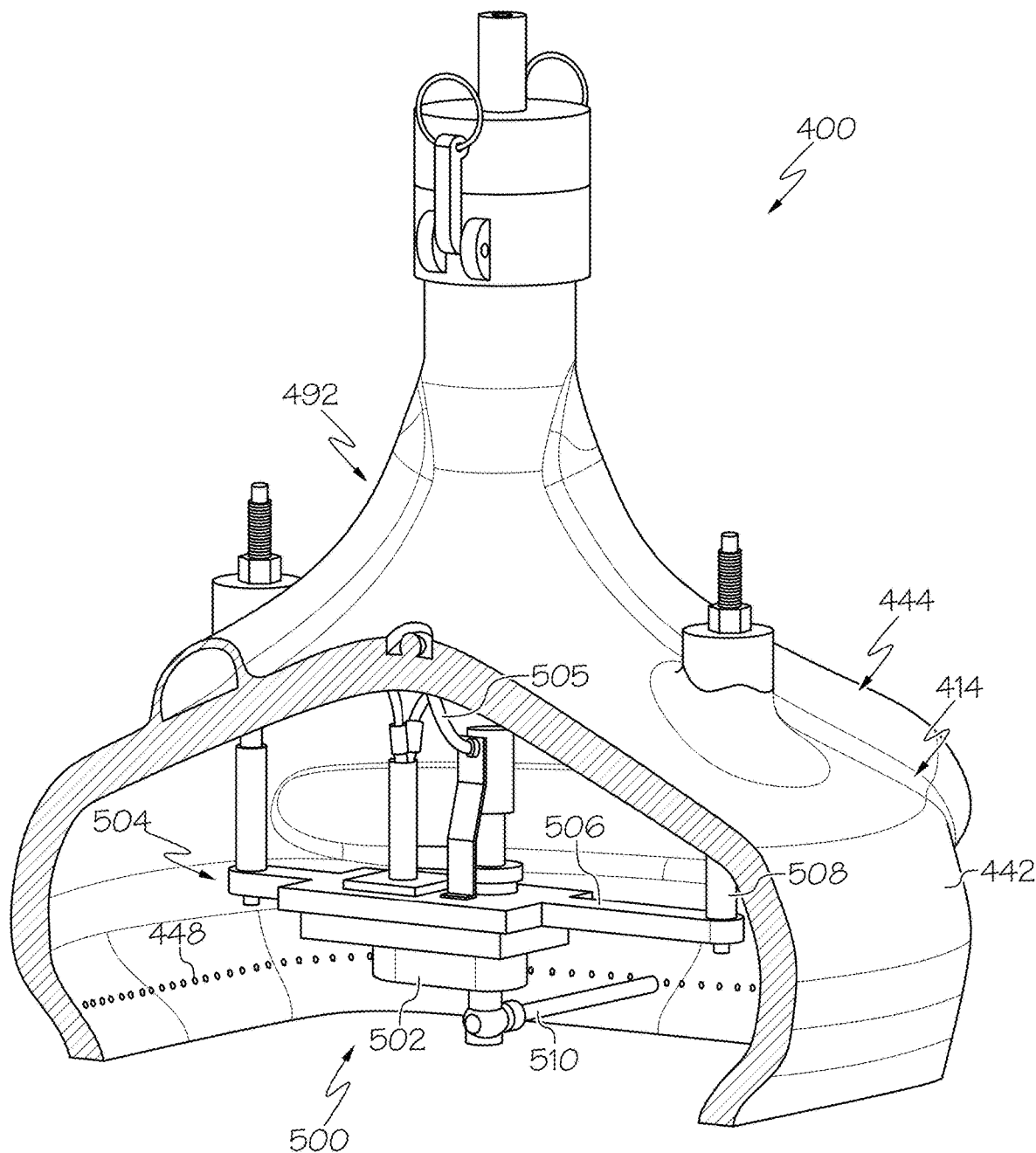
FIG. 14 illustrates a section view of another embodiment of an extraction housing, according to one or more embodiments shown and described herein.
Figure 15:
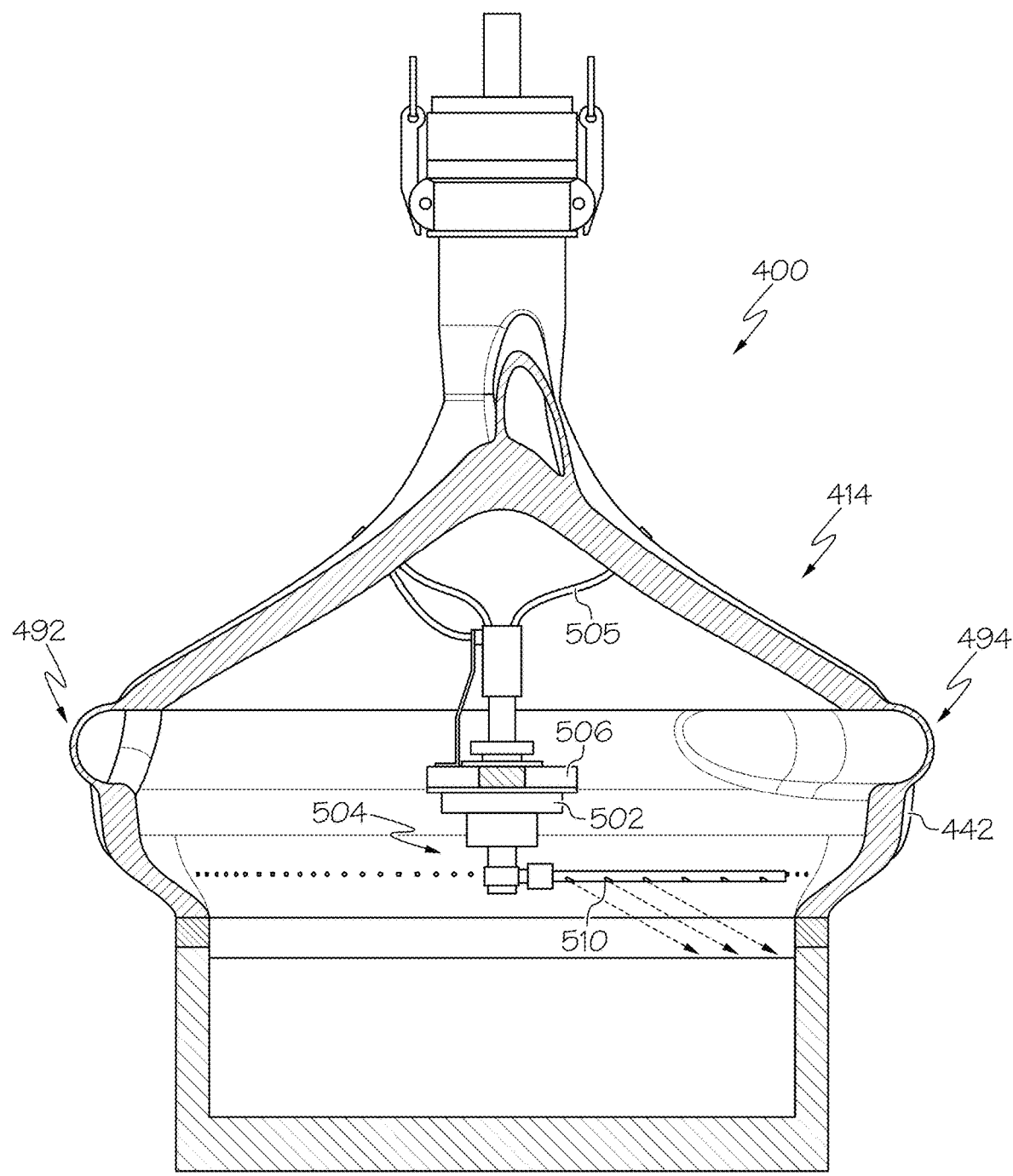
FIG. 15 illustrates another section view of the extraction housing of FIG. 14, according to one or more embodiments shown and described herein.
Figure 16:
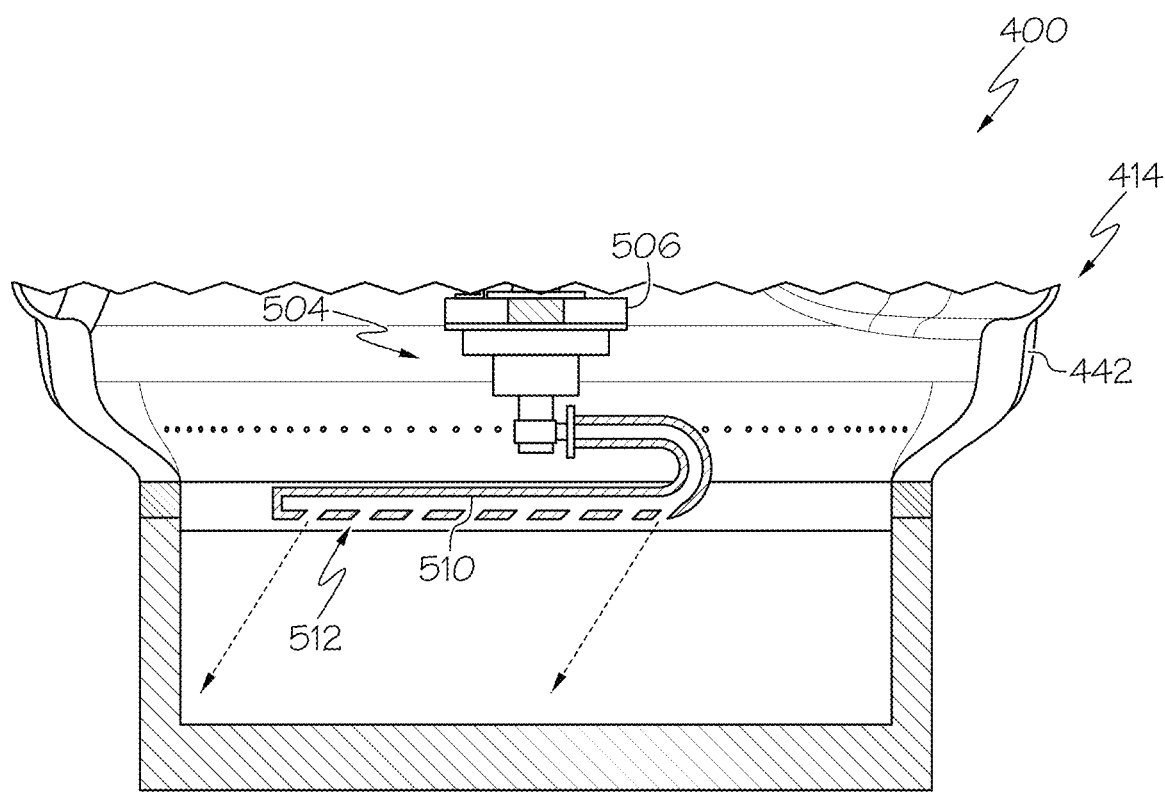
FIG. 16 is a schematic view of a portion of the extraction housing of FIG. 14 showing a rotary jet device, according to one or more embodiments shown and described herein.

Referring to FIGS. 14-16, another embodiment of a powder removal apparatus 400 includes an extraction housing 414 with many features similar to those described above with reference to FIGS. 12 and 13 including a sidewall 442 that is configured to seal upon a build module. A top wall 444 extends between opposite sides of the sidewall 442 that can define part of a turbulence chamber. The sidewall 442 includes sidewall inlet flow channels 448 (FIG. 14) that extend through the sidewall 442 to create vortex flow. The extraction housing 414 may include multiple side exit channels 492 and 494.

In this embodiment, in order to provide added fluid flow in a central region of the vortex flow 445 (FIG. 17), a rotary jet device 500 is provided. The rotary jet device 500 may include an actuator 502, such as a motor, that is mounted on a support structure 504 that is connected to the extraction housing 414. The actuator 502 may be, for example, an air-powered motor that is powered by compressed air that is delivered along line 505. In this embodiment, the support structure includes a transverse mount rod 506 that extends perpendicular to the vertical centerline of the extraction housing 414 and vertically extending mount arms 508 that are connected to opposite ends of the mount rod 506 and also connected to the top wall 444 of the extraction housing 414.

Figure 17:
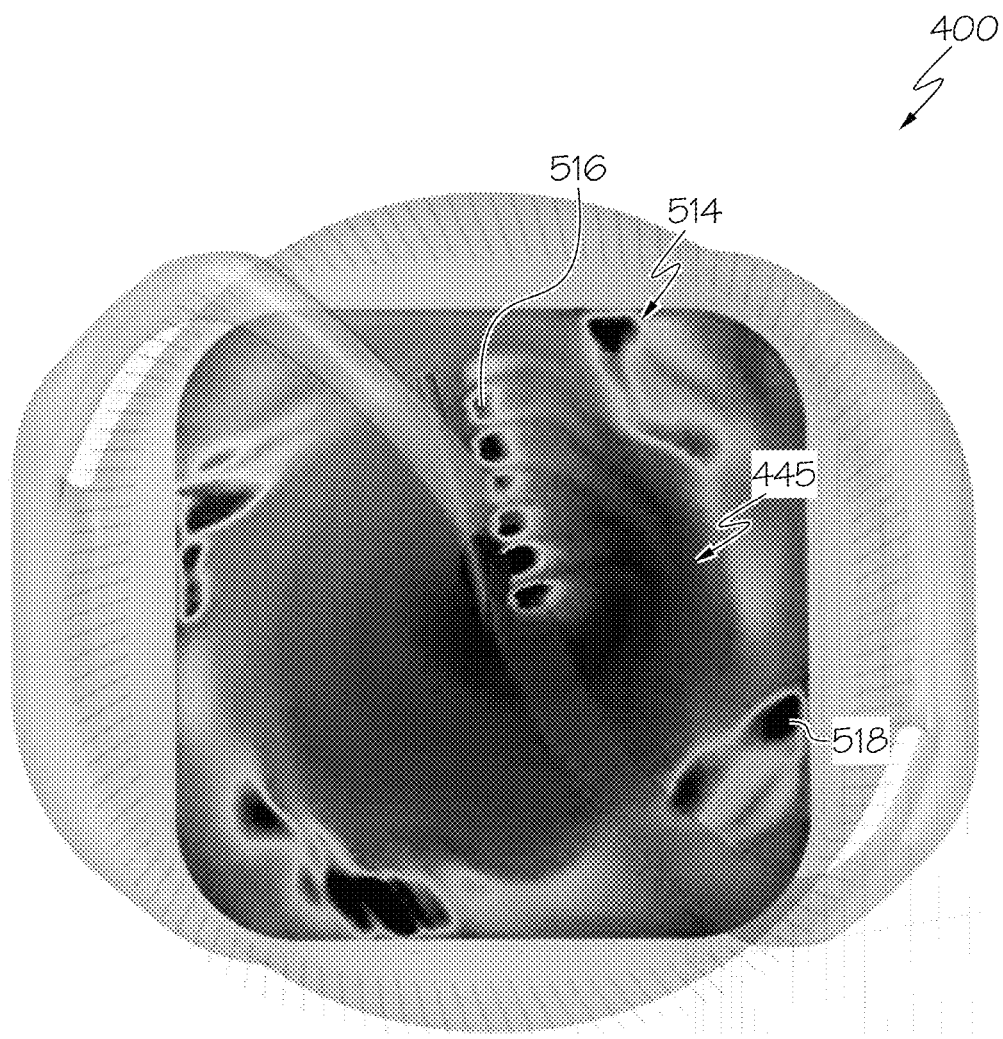
FIG. 17 shows a computational simulation of shear stresses caused by nozzle jets of the rotary jet device of FIG. 16, according to one or more embodiments shown and described herein.

The rotary jet device 500 further includes a nozzle arm 510 that is operatively connected to the actuator 502. The nozzle arm 510 includes an array of nozzles 512 (e.g., openings) through which pressurized air or other fluid can be directed onto the powder bed to disturb the powder in a central region of the powder bed, while incoming fluid through the sidewall inlet flow channels 448 impinged on an outer band region 514 nearer to the sidewall 442. FIG. 17 shows a computation simulation of shear stresses caused by nozzle jets 516 and sidewall jets 518.

The above-described powder removal apparatuses include extraction housings that are used to loosen and remove densely packed powders for cleaning printed parts that can be difficult to be directly vacuumed or otherwise removed. Further, the powder removal apparatuses can be used to remove powders from green parts that may be fragile with low strength and prone to breakage with an external impact. The powder removal apparatus can also reveal hidden parts that are located immersed in the powder bed before depowdering. The extraction housing utilizes a funnel design to introduce a vortex to the powder bed and spin the powders around. By centrifuge force, the larger particles can be forced into side exit channels, which have a shape that can encourage upward movement of the particles toward an exit opening and can be collected for reuse. The depowder process using the powder removal apparatuses can be automated with little impact to product health and can reduce the depowdering time and can be used for mass production of printed parts.

Further aspects of the disclosure are provided by the subject matter of the following clauses:

A powder removal apparatus for use in removing powder from a three-dimensional printed object, the powder removal apparatus comprising: an extraction housing comprising a sidewall that is sized and configured to extend around a powder bed of a build module and a top wall that is sized and configured to extend between opposite sides of the sidewall and over the powder bed, the sidewall and top wall configured to form a chamber portion of a turbulence chamber, the top wall having a vacuum exit opening that is configured to fluidly connect to a vacuum source, the sidewall having a plurality of sidewall inlet flow channels that extend from an inlet opening at an exterior side of the sidewall to an outlet opening at an interior side of the sidewall; and a side exit channel configured to extend along the top wall from a collector opening in communication with the chamber portion toward the vacuum exit opening.

The powder removal apparatus of any of the above clauses, wherein the top wall includes a narrowing portion and a vertically extending necked-down pipe structure that extends to the vacuum exit opening forming an inverted funnel-shape.

The powder removal apparatus of any of the above clauses, wherein the side exit channel extends over a portion of the narrowing portion and along a length of the necked-down pipe structure.

The powder removal apparatus of any of the above clauses, wherein the side exit channel has a curved flow path.

The powder removal apparatus of any of the above clauses, wherein the side exit channel is a first side exit channel and the collector opening is a first collector opening, the powder removal apparatus further comprising a second side exit channel configured to extend along the top wall from a second collector opening in communication with the chamber portion toward the vacuum exit opening.

The powder removal apparatus of any of the above clauses, wherein each first and second side exit channel extends over a portion of the narrowing portion and along a length of the necked-down pipe structure.

The powder removal apparatus of any of the above clauses, wherein each first and second side exit channel has a curved flow path.

The powder removal apparatus of any of the above clauses comprising a purge nozzle that extends inward from the top wall, the purge nozzle being in fluid communication with an inlet opening through the top wall.

The powder removal apparatus of any of the above clauses comprising a plurality of purge nozzles, each purge nozzle being in fluid communication with a respective inlet opening.

The powder removal apparatus of any of the above clauses further comprising a rotary jet device comprising a nozzle arm comprising a nozzle, the rotary jet device located in the chamber portion.

The powder removal apparatus of any of the above clauses, wherein the nozzle arm is operatively connected to an actuator for moving the nozzle arm.

The powder removal apparatus of any of the above clauses, wherein the actuator comprises a motor configured to rotate the nozzle arm.

The powder removal apparatus of any of the above clauses, wherein the nozzle arm comprises a plurality of nozzles.

The powder removal apparatus of any of the above clauses, wherein the side exit channel comprises a lower portion that extends horizontally from the collector opening, a turn portion that turns upward toward the necked-down pipe structure and a vertical portion that extends vertically along the pipe structure.

The powder removal apparatus of any of the above clauses, wherein the extraction housing has a maximum width W and an overall length of the side exit channel is between 2.5W and 3W.

The powder removal apparatus of any of the above clauses, wherein the extraction housing has a maximum width W and a vertical distance of the collector opening from a bottom edge of the extraction housing is between 0.3W and 0.6W.

The powder removal apparatus of any of the above clauses, wherein the extraction housing has a maximum width W and a maximum width of the side exit channel is between 0.3W and 0.5W.

The powder removal apparatus of any of the above clauses, wherein the sidewall may is formed with a rounded portion in cross-sectional shape.

A powder removal system comprising: a build module configured to use as part of an additive manufacturing apparatus; and a powder removal apparatus configured to rest upon the build module and for use in removing powder from a three-dimensional printed object in the build module, the powder removal apparatus comprising: an extraction housing comprising a sidewall that is sized and configured to extend around a powder bed of the build module and a top wall that is sized and configured to extend between opposite sides of the sidewall and over the powder bed, the sidewall and top wall configured to form a chamber portion of a turbulence chamber between the build module and the extraction housing, the top wall having a vacuum exit opening that is configured to fluidly connect to a vacuum source, the sidewall having a plurality of sidewall inlet flow channels that extend from an inlet opening at an exterior side of the sidewall to an outlet opening at an interior side of the sidewall; and a side exit channel configured to extend along the top wall from a collector opening in communication with the chamber portion toward the vacuum exit opening.

The powder removal system of any of the above clauses, wherein the top wall includes a narrowing portion and a vertically extending necked-down pipe structure that extends to the vacuum exit opening forming an inverted funnel-shape.

The powder removal system of any of the above clauses, wherein the side exit channel extends over a portion of the narrowing portion and along a length of the necked-down pipe structure.

The powder removal system of any of the above clauses, wherein the side exit channel has a curved flow path.

The powder removal system of any of the above clauses comprising a purge nozzle that extends inward from the top wall, the purge nozzle being in fluid communication with an inlet opening through the top wall.

The powder removal system of any of the above clauses further comprising a rotary jet device comprising a nozzle arm comprising a nozzle, the rotary jet device located in the turbulence chamber.

The powder removal system of any of the above clauses further comprising a bath apparatus that includes a tank that is configured to contain a solvent configured to remove excess powder from a three-dimensional printed part.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A powder removal apparatus for use in removing powder from a three-dimensional printed object, the powder removal apparatus comprising:
    an extraction housing comprising a sidewall that is sized and configured to extend around a powder bed of a build module and a top wall that is sized and configured to extend between opposite sides of the sidewall and over the powder bed, the sidewall and top wall configured to form a chamber portion of a turbulence chamber, the top wall having a vacuum exit opening that is configured to fluidly connect to a vacuum source, the sidewall having a plurality of sidewall inlet flow channels that extend from an inlet opening at an exterior side of the sidewall to an outlet opening at an interior side of the sidewall; and
    a side exit channel configured to extend along the top wall from a collector opening in communication with the chamber portion toward the vacuum exit opening.

2. The powder removal apparatus of claim 1, wherein the top wall includes a narrowing portion and a vertically extending necked-down pipe structure that extends to the vacuum exit opening forming an inverted funnel-shape.

3. The powder removal apparatus of claim 2, wherein the side exit channel extends over a portion of the narrowing portion and along a length of the necked-down pipe structure.

4. The powder removal apparatus of claim 3, wherein the side exit channel has a curved flow path.

5. The powder removal apparatus of claim 2, wherein the side exit channel is a first side exit channel and the collector opening is a first collector opening, the powder removal apparatus further comprising a second side exit channel configured to extend along the top wall from a second collector opening in communication with the chamber portion toward the vacuum exit opening.

6. The powder removal apparatus of claim 5, wherein the first side exit channel and the second side exit channel each extends over a portion of the narrowing portion and along a length of the necked-down pipe structure.

7. The powder removal apparatus of claim 6, wherein each of the first side exit channel and the second side exit channel has a curved flow path.

8. The powder removal apparatus of claim 1 comprising a purge nozzle that extends inward from the top wall, the purge nozzle being in fluid communication with a top inlet opening through the top wall.

9. The powder removal apparatus of claim 1 further comprising:
    a rotary jet device comprising a nozzle arm comprising a nozzle, the rotary jet device located in the chamber portion; and
    an actuator operatively connected to the nozzle arm and configured to rotate the nozzle arm.

10. The powder removal apparatus of claim 1, wherein the side exit channel comprises a lower portion that extends horizontally from the collector opening, a turn portion that turns upward toward a necked-down pipe structure and a vertical portion that extends vertically along the necked-down pipe structure.

11. The powder removal apparatus of claim 1, wherein the extraction housing has a maximum width W and an overall length of the side exit channel is between 2.5W and 3W.

12. The powder removal apparatus of claim 1, wherein the extraction housing has a maximum width W and a vertical distance of the collector opening from a bottom edge of the extraction housing is between 0.3W and 0.6W.

13. The powder removal apparatus of claim 1, wherein the extraction housing has a maximum width W and a maximum width of the side exit channel is between 0.3W and 0.5W.

14. A powder removal system comprising:
    a build module configured to use as part of an additive manufacturing apparatus; and
    a powder removal apparatus configured to rest upon the build module and for use in removing powder from a three-dimensional printed object in the build module, the powder removal apparatus comprising:
        an extraction housing comprising a sidewall that is sized and configured to extend around a powder bed of the build module and a top wall that is sized and configured to extend between opposite sides of the sidewall and over the powder bed, the sidewall and top wall configured to form a chamber portion of a turbulence chamber between the build module and the extraction housing, the top wall having a vacuum exit opening that is configured to fluidly connect to a vacuum source, the sidewall having a plurality of sidewall inlet flow channels that extend from an inlet opening at an exterior side of the sidewall to an outlet opening at an interior side of the sidewall; and
        a side exit channel is configured to extend along the top wall from a collector opening in communication with the chamber portion toward the vacuum exit opening.

15. The powder removal system of claim 14, wherein the top wall includes a narrowing portion and a vertically extending necked-down pipe structure that extends to the vacuum exit opening forming an inverted funnel-shape.

16. The powder removal system of claim 15, wherein the side exit channel extends over a portion of the narrowing portion and along a length of the necked-down pipe structure.

17. The powder removal system of claim 16, wherein the side exit channel has a curved flow path.

18. The powder removal system of claim 14 comprising a purge nozzle that extends inward from the top wall, the purge nozzle being in fluid communication with a top inlet opening through the top wall.

19. The powder removal system of claim 14 further comprising a rotary jet device comprising a nozzle arm comprising a nozzle, the rotary jet device located in the turbulence chamber.

20. The powder removal system of claim 14 further comprising a bath apparatus that includes a tank that is configured to contain a solvent configured to remove excess powder from a three-dimensional printed part.

* * * * *